(12) United States Patent
Asai

(10) Patent No.: US 9,423,987 B2
(45) Date of Patent: Aug. 23, 2016

(54) DATA PROCESSING APPARATUS CONFIGURED TO EXECUTE PRINTING USING PRINT SETTING

(71) Applicant: Brother Kogyo Kabushiki Kaisha, Nagoya (JP)

(72) Inventor: Daisuke Asai, Seto (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 14/810,592

(22) Filed: Jul. 28, 2015

(65) Prior Publication Data

US 2016/0034234 A1 Feb. 4, 2016

(30) Foreign Application Priority Data

Jul. 30, 2014 (JP) .................................. 2014-155416

(51) Int. Cl.
*G06F 3/12* (2006.01)

(52) U.S. Cl.
CPC ............ *G06F 3/1205* (2013.01); *G06F 3/1204* (2013.01); *G06F 3/1257* (2013.01); *G06F 3/1286* (2013.01)

(58) Field of Classification Search
None
See application file for complete search history.

(56) References Cited

U.S. PATENT DOCUMENTS

| 2002/0067491 | A1* | 6/2002 | Minagawa | G06F 3/04847 358/1.2 |
| 2010/0033759 | A1* | 2/2010 | Motokado | G06F 3/1205 358/1.15 |
| 2010/0235424 | A1* | 9/2010 | Mori | G06K 9/00442 709/202 |

FOREIGN PATENT DOCUMENTS

JP 2008-217826 A 9/2008

* cited by examiner

*Primary Examiner* — Andrew H Lam
(74) *Attorney, Agent, or Firm* — Burr & Brown, PLLC

(57) ABSTRACT

A non-transitory computer readable storage medium stores a printer driver executable by a data processing apparatus. The data processing apparatus includes a storage device and is configured to execute application program. The printer driver causes the data processing apparatus to perform: acquiring, in response to receiving a print instruction from the application program, a parameter provided by the application program for at least one setting items relating to printing; determining, as a print setting, one predetermined parameter set of a plurality of predetermined parameter sets that are stored in the storage device, each of the plurality of predetermined parameter sets including a plurality of predetermined parameters for the plurality of setting items relating to printing, the one predetermined parameter set being relevant to the parameter provided by the application program; generating a print command in accordance with the print setting; and outputting the print command to a printer.

12 Claims, 4 Drawing Sheets

DATA PROCESSING APPARATUS CONFIGURED TO EXECUTE PRINTING USING PRINT SETTING

CROSS REFERENCE TO RELATED APPLICATION

This application claims priority from Japanese Patent Application No. 2014-155416 filed Jul. 30, 2014. The entire content of the priority application is incorporated herein by reference.

TECHNICAL FIELD

The present disclosure relates to a data processing apparatus and a printer driver installed therein.

BACKGROUND

Japanese Patent Application Publication No. 2008-217826 describes a data processing apparatus that registers, as "favorites", groups of parameters for all setting items that are to be set by using a printer driver and can select the parameter group of one "favorite" among a plurality of the registered "favorites" as print settings used in printing. The data processing apparatus uses parameters for specific items that are set by an application as the print settings for the specific items, and uses parameters for items except for the specific items that are included in the selected "favorite" as the print settings for items except for the specific items.

SUMMARY

However, in the data processing apparatus disclosed in Japanese Patent Application Publication No. 2008-217826, a user need select one "favorite" from among the plurality of the "favorites" in advance, the one "favorite" having parameters for the items except for the specific item that are suitable for the parameter for the specific item that is determined in the application. This causes inconvenience to the user.

It is therefore an object of the disclosure to provide a data processing apparatus and a printer driver that are capable of easily using print settings appropriate to parameter settings of an application.

In order to attain the above and other objects, the disclosure provides a non-transitory computer readable storage medium storing a printer driver executable by a data processing apparatus. The data processing apparatus includes a storage device and is configured to execute application program. The printer driver causes the data processing apparatus to perform: acquiring, in response to receiving a print instruction from the application program, a parameter provided by the application program for at least one of a plurality of setting items relating to printing; determining, as a print setting, one predetermined parameter set of a plurality of predetermined parameter sets that are stored in the storage device, each of the plurality of predetermined parameter sets including a plurality of predetermined parameters for the plurality of setting items relating to printing, the one predetermined parameter set being relevant to the parameter provided by the application program; generating a print command in accordance with the print setting; and outputting the print command to a printer.

According to another aspect, the disclosure provides a data processing apparatus including a control device and a storage device. The storage device stores: application program; a printer driver executed by the control device; and a plurality of predetermined parameter sets. Each of the plurality of predetermined parameter sets includes a plurality of predetermined parameters for a plurality of setting items relating to printing. The printer driver causes the data processing apparatus to perform: acquiring, in response to receiving a print instruction from the application program, a parameter provided by the application program for at least one of the plurality of setting items; determining one predetermined parameter set of the plurality of predetermined parameter sets as a print setting, the one predetermined parameter set being relevant to the parameter provided by the application program; generating a print command in accordance with the print setting; and outputting the print command to a printer.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
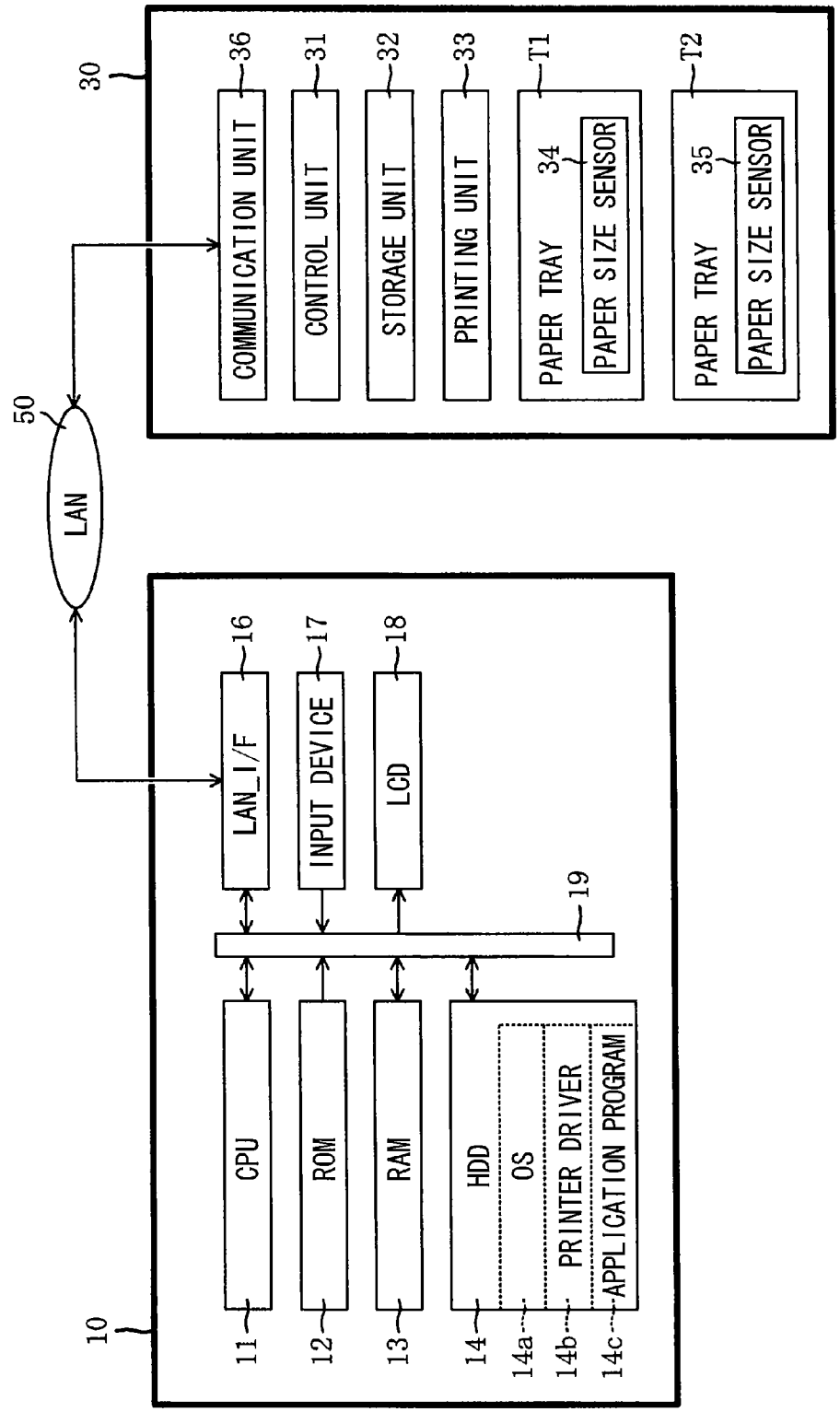
FIG. 1 is a block diagram showing an electrical configuration of a data processing apparatus in which a printer driver is installed according to an embodiment.

An embodiment of the disclosure will be described with reference to FIGS. 1 to 3B. FIG. 1 is a block diagram illustrating an electrical configuration of a personal computer (hereinafter, referred to as a "PC") 10 equipped with a printer driver 14b. The PC 10 is connected to a printer 30 via a local area network (hereinafter, referred to as a "LAN") 50.

As described in detail later, the PC 10 equipped with the printer driver 14b selects a parameter list that is set as printing settings in an application program (hereinafter, referred to as an "application") 14c from among a plurality of parameter lists that are prepared in advance, and then uses the selected parameter list as print settings used in printing. Each parameter list includes a group of parameters set for a plurality of setting items relating to printing.

The PC 10 includes a CPU 11, a ROM 12, a RAM 13, a hard disk drive (hereinafter, referred to as a "HDD") 14, a LAN interface (hereinafter, referred to as a "LAN_I/F") 16, an input device 17, and an LCD 18, and these components are connected to each other via a bus line 19.

The CPU 11 is configured to control the components connected to the CPU 11 via the bus line 20 according to fixed values or programs stored in the ROM 12 or HDD 14 and to execute processes for realizing functions based on an operating system (hereinafter, referred to as an "OS") 14a or various programs such as the printer driver 14b and the application 14c.

The ROM 12 is a memory storing programs for controlling operations of the PC 10. The RAM 13 is a rewritable volatile memory having a temporary area for temporarily storing data required for processes of the CPU 11.

The HDD 14 is a rewritable non-volatile storage device. The HDD 14 stores the OS 14a, the printer driver 14b, and the application 14c. The OS 14a is, for example, a Windows (registered trade mark) OS provided by Microsoft (registered trade mark).

The printer driver 14b is a program for controlling the printer 30. The printer driver 14b controls the printer 30 to execute printing based on print data received from the application 14c through the OS 14a. In the embodiment, the printer driver 14b is configured so as to register, as the parameter lists, combinations of the parameters for the plurality of the setting items relating to the printing.

As described in detail later, the printer driver 14b selects, from among the registered parameter lists, a parameter list suitable for a parameter that is set for a specific setting item (a paper size in the embodiment) and acquired from the application 14c, and then the printer driver 14b uses the selected parameter as the print settings. Therefore, the printer driver 14b can control the printer 30 to execute printing with the printing settings suitable for the parameters that are set by the application 14c. Flowcharts of FIGS. 3A and 3B described below illustrate processes executed by the CPU 11 under the control of the printer driver 14b.

The application 14c is a program capable of producing to-be-printed data. When the application 14c receives an input of a print instruction, the print data is transferred to the printer driver 14b through the OS 14a. The print data include: a drawing command produced by the OS 14a on the basis of data produced by the application 14c; and the print settings that are set by the application 14c. The print settings included in the print data are configured with combinations of: setting items relating to printing; and parameters set by the application 14c for the setting items. The print data include, as the print settings, one or a plurality of combinations of the setting items and the parameters.

The application 14c can set parameters for some setting items of the printing-related setting items that can be set by the printer driver 14b. More specifically, the application 14c can set parameters for setting items stored in a public area in a DEVMODE structure.

The DEVMODE structure is a data structure where the parameters relating to printing are stored in a binary data format under the environment of the OS 14a. The DEVMODE structure includes a public area and a private area. The public area is an area of storing parameters for general setting items, of which specifications are published, such as a paper size, or a value defining whether to be duplex printing or simplex printing. The general setting items are included in the setting items relating to printing. Both of the printer driver 14b and the application 14c can access the public area.

The private area is an area of storing the parameters for setting items whose specifications are not published. Only the printer driver 14b can access the private area. In other words, the parameters for the setting items stored in the public area can be set by any one of the printer driver 14b and the application 14c, and in contrast, the parameters for the setting items stored in the private area can be set by only the printer driver 14b.

Hereinafter, in some cases, the CPU 11 executing programs such as the OS 14a, the printer driver 14b, or the application 14c may be written only by the program names. For example, the term "printer driver" may denote the "CPU 11 executing the printer driver".

The input device 17 is a device for inputting instructions or information to the PC 10, and a keyboard and a mouse are exemplified. The LCD 18 is a liquid crystal display apparatus. The LAN_I/F 16 is an interface for communicating with other apparatuses connected via the LAN 50. The PC 10 may be connected to the printer 30 via the LAN 50.

The printer 30 is a printing apparatus configured to perform a process of forming an image on a recording paper, for example, in an inkjet scheme or an electrophotographic scheme. In the embodiment, the printer 30 is an inkjet printer. The printer 30 includes paper trays T1 and T2, a control unit 31, a storage unit 32, a printing unit 33, paper size sensors 34 and 35, and a communication unit 36.

The control unit 31 constitutes a computer and includes a CPU (not shown) and an ROM and RAM that are electrically connected to the CPU. The control unit 31 controls operations of the printer 30 according to a program or data stored in the ROM and the storage unit 32. For example, the control unit 31 is configured to control the printing unit 33 to print an image on the basis of page description language data (hereinafter, referred to as a "PDL data") received from the PC 10.

The storage unit 32 is a non-volatile storage device, such as a flash memory. In the embodiment, the storage unit 32 stores, as tray information, combinations of paper sizes and paper types of the recording papers that are placed on two paper trays T1 and T2 of the printer 30. As values settable as the parameter for the paper size, values representing A4 and L-size are exemplified. As value settable as the parameter for the paper type, values representing plain paper and glossy paper may be exemplified. The user may store an appropriate combination of the parameters for the paper size and the paper type, for example, a combination of the value representing A4 and the value representing the plain paper, as the tray information in the storage unit 32.

The printing unit 33 is a device configured to print an image on the recording paper in the inkjet scheme. The printing unit 33 includes a conveying mechanism (not shown) and a print head (not shown) and forms an image based on the PDL data received from the PC 10 on the recording paper by ejecting the ink charged in an ink cartridge (not shown) from the print head while the conveying mechanism conveys the recording paper from the paper tray T1 or the paper tray T2.

The paper size sensors 34 and 35 are disposed on the paper trays T1 and T2, respectively. Each paper size sensor 34, 35 is a sensor configured to detect the paper size and output a signal corresponding to the size of the recording paper placed on the corresponding paper tray T1, T2 on the basis of distances between pairs of paper guides (not shown) provided in the corresponding paper tray T1, T2. The control unit 31 detects the size of the recording paper placed on the paper tray T1, T2 on the basis of the signal output from the corresponding paper size sensor 34, 35.

The communication unit 36 is an interface for communicating with other apparatus connected to the LAN 50. In the embodiment, the communication unit 36 and the LAN_I/F 16 are connected to the LAN 50, so that the PC 10 and the printer 30 are communicated to each other.

Figure 2:
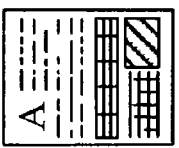
FIG. 2 is an explanatory diagram showing an example of a property window of the printer driver.

FIG. 2 is a schematic diagram illustrating an example of a property window 70 of the printer driver 14b. When an instruction of displaying the property window 70 is input in the application 14c, the property window 70 is displayed on the LCD 18. In the property window 70, the parameter lists registered by the user are displayed in a display area 81.

In the example illustrated in FIG. 2, six types of the parameter lists Q1 to Q6 are displayed in the display area 81. Each parameter list includes: a parameter group P1 that is a combination of the parameters of the paper size and the paper type; and a parameter group P2 that is a combination of parameters set for setting items other than the paper size and the paper type. As other setting items, values defining print quality, layout, and duplex printing or simplex printing are exemplified. As values settable as the parameter for the print quality, values representing normal image quality and the highest image quality are exemplified. As values settable as the parameter for layout, values representing printing of N-page document on one page of paper are exemplified (N is an integer of 1 or more), and for example, 1-in-1 and 4-in-1 are exemplified.

As described in detail later, the printer driver 14b according to the embodiment uses, as the print settings, a parameter list that is one of the plurality of parameter lists registered by the user and includes the parameter group P1 matching both: the parameter for the paper size set in the application 14c; and the tray information acquired from the printer 30.

The user can appropriately register a parameter list including the parameter groups P1 and P2 when a register button 82 is selected and input. The registered parameter list is stored in an area associated with the printer driver 14b in the HDD 14. The parameter list registered by the user is displayed in the display area 81 as one parameter list. In the example illustrated in FIG. 2, six types of the parameter lists Q1 to Q6 are displayed in the display area 81. When the number of registered parameter lists exceeds the number of parameter lists that can be displayed in the display area 81, the parameter list displayed in the display area 81 can be changed by moving a slide bar in the up-down direction.

An edit button 83 is displayed in each of the parameter lists Q1 to Q6 in the display area 81. The user can input an operation for executing the edit button 83 to appropriately change a value of the parameter included in the parameter list corresponding to the edit button 83 for object of the input operation.

Figure 3A:
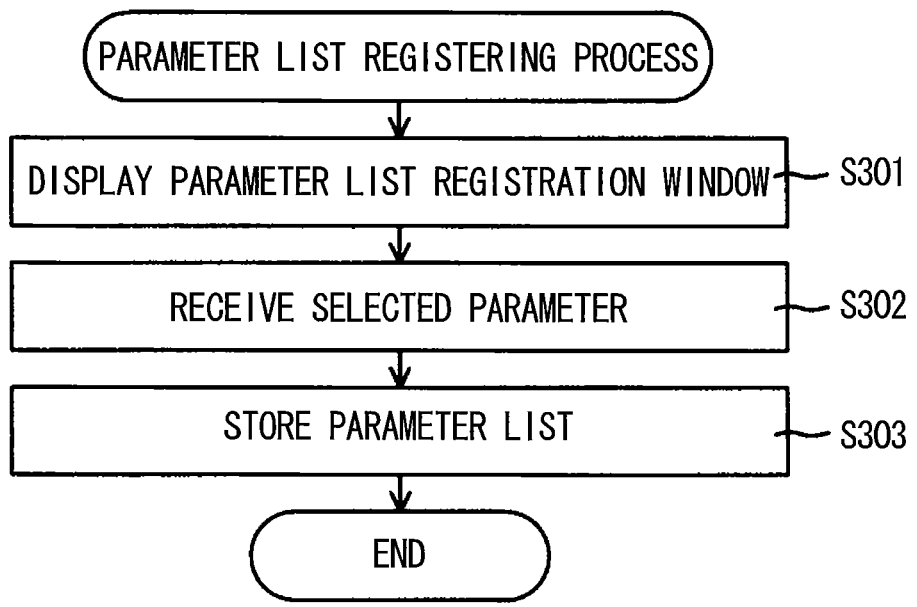
FIG. 3A is a flowchart illustrating steps in a parameter list registering process executed by a control device of the data processing apparatus.

FIG. 3A is a flowchart illustrating a parameter list registering process executed by the CPU 11 according to the printer driver 14b. The parameter list registering process is started when the CPU 11 receives the operation for executing the register button 82. In S301, the CPU 11 displays a parameter list registration window (not shown) on the LCD 18. The parameter list registration window is a user interface allowing the user to select a plurality of parameters for the plurality of setting items and to register the selected parameters as parameters included in the parameter list.

In S302, the CPU 11 receives the parameters for the respective setting items selected in the parameter list registration window. In S303, the CPU 11 stores and registers in the HDD 14 the received parameters for the respective setting items as parameters included in the parameter list. In other words, the CPU 11 registers, as one parameter list, the parameter list including combinations of the selected parameters and setting items in S303. Then, the CPU 11 ends the parameter list registering process.

Figure 3B:
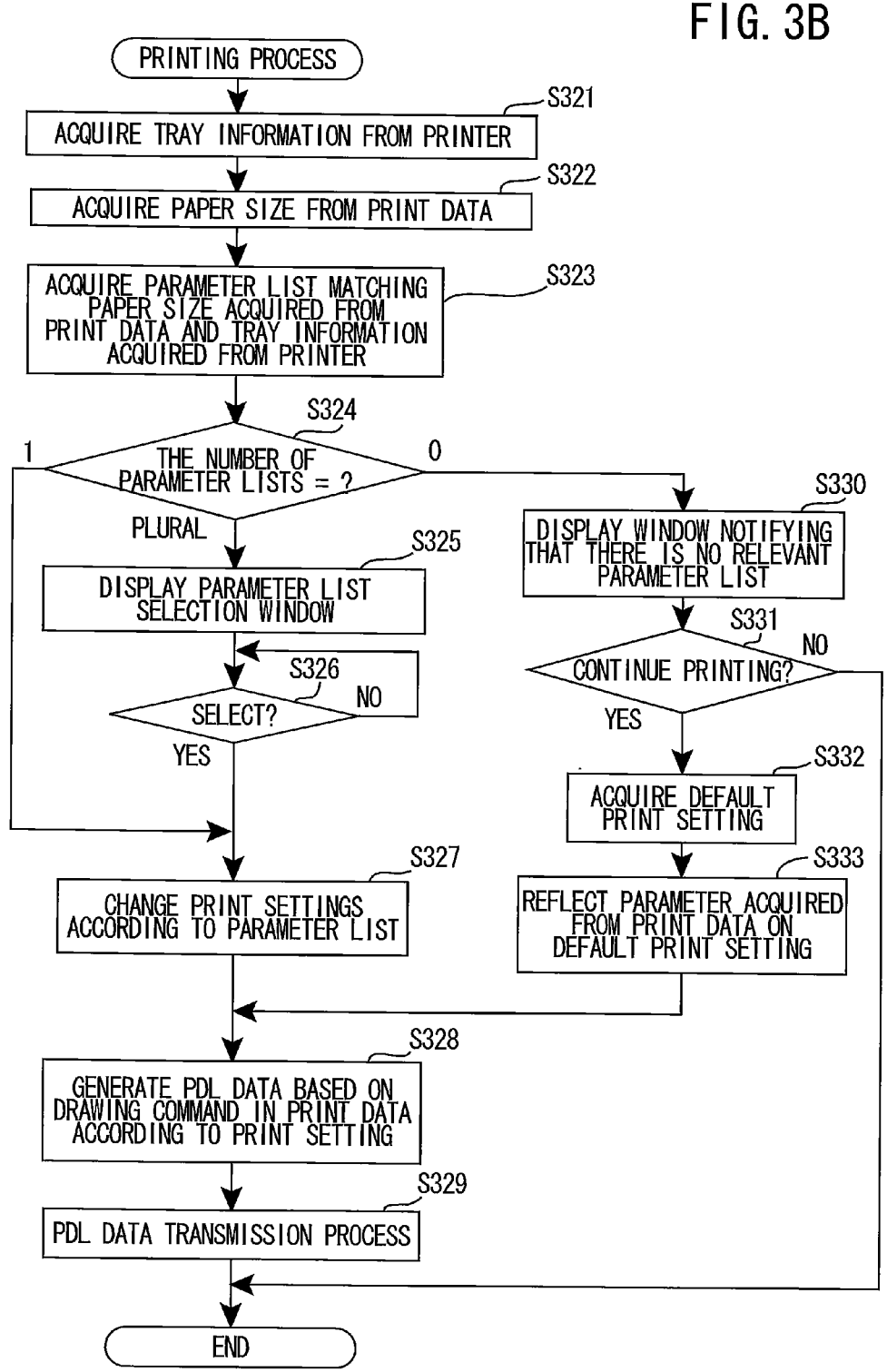
FIG. 3B is a flowchart illustrating steps in a printing process executed by the control device.

FIG. 3B is flowchart illustrating a printing process executed by the CPU 11 under the control of the printer driver 14b. This printing process is started when the printer driver 14b receives print data from the application 14c via the OS 14a. The print data is In S321, the CPU 11 receives and acquires the tray information from the printer 30. More specifically, the CPU 11 sends, to the printer 30 that the printer driver 14b sets as a printer of performing printing, a query about the tray information of the printer 30. The printer 30 receives the query and responds with the tray information stored in the storage unit 32. The CPU 11 acquires the tray information responded from the printer 30.

In S322, the CPU 11 acquires the parameter for the paper size from the received print data. In S323, the CPU 11 acquires, from among the registered parameter lists, a parameter list matching both the parameter for the paper size acquired from the print data and the tray information acquired from the printer 30. More specifically, if the registered parameter lists contains a parameter list including a combination of: a parameter for the paper size that is same as the paper size parameter acquired from the print data; and a parameter for the paper type that is combined with the paper size parameter acquired from the print data in the tray information, the CPU 11 acquires the parameter list as the relevant parameter list.

For example, when the parameter for the paper size acquired from the print data is a value representing A4 and the parameters for the paper size and the paper type that are included in the tray information acquired from the printer 30 are values representing A4 and plain paper, the CPU 11 acquires the parameter list Q1. If there is a plurality of the relevant parameter lists, the CPU 11 acquires all the relevant parameter lists in S323.

The CPU 11 determines the number of parameter lists acquired in S323 (S324). If the CPU 11 determines that the number of acquired parameter lists is one (S324: 1), the CPU 11 changes the print settings in accordance with the one parameter list acquired in S323 (S327). In other words, the CPU 11 appoints the one parameter list as the print setting in relation to the parameter acquired from the print data and the tray information received from the printer 30. Therefore, if the number of parameter lists acquired in S323 is one, the parameters for the respective setting items included in the relevant one parameter list are used as the print settings for generating the PDL data.

In S328, the CPU 11 generates the PDL data from the drawing command included in the print data in accordance with the print settings that have been changed in S327. In S329, the CPU 11 executes a PDL data transmission process of transmitting the generated PDL data to the printer 30 that can be controlled by the printer driver 14b, more specifically, to the printer 30 that the printer driver 14b sets as a printer for performing printing. And then, the CPU 11 ends the printing process.

If the CPU 11 determines that the number of parameter lists acquired in S323 is no less than two (S324: plural), the CPU 11 displays a parameter list selection window (not shown) on the LCD 18 (S325). The parameter list selection window is a user interface allowing the user to select one parameter list from among the plurality of the parameter lists acquired in S323.

The CPU 11 waits for the selection of one parameter list in the parameter list registration window (S326: No). When the CPU 11 receives the selection of one parameter list (S326: Yes), in S327 the CPU 11 changes the print settings according to the selected one parameter list. Therefore, when the number of parameter lists acquired in S323 is no less than two (S324: plural), parameters for the respective setting items included in the user-selected one parameter list are used as the print settings for generating the PDL data.

When the CPU 11 determines that the number of parameter lists acquired in S323 is zero, that is, when there is no parameter list matching both the paper size parameter acquired from the print data and the tray information acquired from the printer 30 (S324: 0), the CPU 11 displays on the LCD 18 a window indicating that there is no relevant parameter list in the registered parameter lists (S330). Therefore, the user can recognize from the window displayed in S330 that there is no parameter list matching the parameters that are set in the application 14c.

The window displayed in S330 is also used as a query window for inquiring of the user whether the printing should continue or not. Therefore, when the number of parameter lists acquired in S323 is zero, the user can be allowed to select whether or not to continue to print. If the CPU 11 receives an instruction indicating that the printing need not continue through the query window (S331: No), the CPU 11 ends the printing process.

On the other hand, if the CPU 11 receives an instruction indicating that the printing should continue via the query window displayed in S330 (S331: Yes), the CPU 11 acquires print settings (hereinafter, referred to as a "default print settings") prepared as default in advance. For example, the default print settings are print settings acquired during the installation of the printer driver 14*b*.

In S333, the CPU 11 reflects the parameters acquired from the print data on the default print settings. More specifically, the printer driver 14*b* accesses the public area and/or the private area of the DEVMODE structure and modifies and changes, to the parameters acquired from the print data, parameters for setting items corresponding to the parameters acquired from the print data in the default print settings stored in the DEVMODE structure. The CPU 11 generates the PDL data in accordance with the default print settings on which the parameters acquired from the print data have been reflected after the process of S333 (S328).

According to the printer driver 14*b* in the embodiment, one parameter list including parameters that the application program 14*c* sets as the print settings is selected from among the plurality of the parameter lists registered by the user. Then, the selected one parameter list is used as the print settings in printing. Therefore, it is possible to avoid the inconvenience in that the printer driver 14*b* needs to be executed to set the parameters for the setting items that cannot be set by using the application 14*c*. Particularly, since the parameter list used as the print settings can be selected from among the parameter lists registered by the user, the parameter list suitable for user's intention can be used as the print settings.

The printer driver 14*b* according to the embodiment selects the parameter list on the basis of the tray information acquired from the printer 30. Therefore, the parameter list suitable for the situation of the paper trays T1 and T2 of the printer 30 can be used as the print settings. Accordingly, printing can be performed with the optimal print settings suitable for the situation of the paper trays T1 and T2.

With the printer driver 14*b* according to the embodiment, when the plurality of the parameter lists registered by the user include a plurality of candidate parameter lists that may be appointed as the print settings (that is, a plurality of the parameter lists acquired in S323), the user can be allowed to select one parameter list as the print settings from among the plurality of the parameter lists in the parameter list selection window. Therefore, the parameter list suitable for user's intention can be used as the print settings.

On the other hand, when there is no candidate parameter list in the plurality of the parameter lists registered by the user, printing can be performed using the default print settings. More specifically, printing can be performed by using the reflected print settings obtained by reflecting the parameters acquired from the print data on the default print settings. Therefore, even if there is no candidate parameter list that may be determined as the print settings and the default print settings are used, the parameters set by the application 14*c* can be reflected on the default print settings and the reflected default print settings can be used for printing.

In the embodiment described above, the printer driver 14*b* is an example of a printer driver. The application 14*c* is an example of an application program. The PC 10 is an example of a data processing apparatus. The CPU 11 is an example of a control device. The HDD 14 is an example of a non-transitory computer readable storage medium and an example of a storage device. The LCD 18 is an example of a display device. The printer 30 is an example of a printer.

Setting items such as the paper size, paper type, and layout are an example of a plurality of different setting items relating to printing. Each of parameters for setting items such as the paper size, paper type, and layout is an example of a parameter. The parameter lists Q1 to Q6 are an example of a plurality of predetermined parameter sets. The default print setting is an example of a default parameter set. The parameter list registration window is an example of a screen for receiving a plurality of parameters for a plurality of setting items relating to printing. The parameter list selection window is an example of a screen for receiving a selection of one predetermined parameter set of at least two candidate predetermined parameter sets. The window indicating that there is no relevant parameter list in the registered parameter lists displayed in S330 is an example of a screen for notifying that no candidate predetermined parameter set is included in a plurality of predetermined parameter sets when no candidate predetermined parameter set is included in the plurality of predetermined parameter sets.

While the description has been made in detail with reference to specific embodiment thereof, it would be apparent to those skilled in the art that various changes and modifications may be made therein.

In the embodiment described above, the PC 10 is exemplified as the data processing apparatus in which the printer driver 14*b* is installed. However, various apparatuses such as a smart phone and a tablet terminal connectable to the printer 30 can be employed as the data processing apparatus where the printer driver 14*b* is to be equipped. In the embodiment, Windows (registered trade mark) OS is exemplified as the OS 14*a*. However, a different OS may be employed as the OS 14*a*.

In the embodiment described above, the printer 30 is exemplified as the device controlled by the printer driver 14*b*. The device controlled by the printer driver 14*b* is not limited to a printing apparatus such as the printer 30 having only a printing function of the printing unit 33, but an apparatus having at least the printing function may be used. Such an apparatus may include a multi-functional peripheral apparatus having the printing function and other functions such as a scanner function.

In the embodiment described above, in S323 the CPU 11 acquires, from among the parameter lists registered by the user, a parameter list matching both the paper size parameter acquired from the print data and the tray information acquired from the printer 30. Parameters used for acquiring the parameter list in S323 are not limited to the paper size, but may be parameters for various setting items acquired from the print data.

For example, parameters for one or a plurality of setting items, such as print quality, other than the paper size may be used to acquire the parameter list in S323, as well as the parameter for the paper size acquired from the print data.

In the embodiment described above, the parameter is acquired on the basis of the tray information from among the parameter lists registered by the user. However, the parameter list including the parameter for the paper size acquired from the print data may be acquired without consideration of the tray information. In this modified example, the process of acquiring the tray information from the printer 30 (S321 in FIG. 3B) may be omitted.

In the embodiment described above, the tray information includes a combination of the paper size and the paper type of the recording paper. However, the tray information may include only the paper size without consideration of the paper type. In this modified example, a paper size detected by the paper size sensor 34 or 35 may be employed as the tray information. Alternatively, the tray information may be configured with only the paper type.

Further, information indicating whether the recording paper is placed on the paper tray may also be employed as the tray information, in addition to the paper size and the paper type. The information indicating whether the recording paper is placed on the paper tray may be detected by using sensors that are provided to the paper trays T1 and T2 and are configured to detect whether the recording paper exists or not. In a case where the information indicating whether the recording paper is placed on the paper tray is used as the tray information, the CPU 11 may acquire the parameter list including the parameter for a paper size acquired from the print data from among the parameter lists registered in S323 when the tray information indicates that the recording paper having the paper size indicated by the parameter acquired from the print data is placed on one of the paper trays T1 and T2.

Further, other information on the printer 30, such as information indicating whether or not duplex printing can be performed or information indicating whether or not color printing can be performed, may be used instead of the tray information. In this modified example, the CPU 11 may acquire the parameter list including a value representing the duplex printing from among registered parameter lists when the following conditions (a) and (b) are met: the condition (a) that the value defining whether the printing is duplex printing or simplex printing that is acquired from the print data is the same as a value representing the duplex printing; and the condition (b) that the information acquired from the printer 30 and representing whether or not the duplex printing can be performed is the same as a value representing that the duplex printing can be performed.

In the embodiment described above, the matched parameter list is acquired from among the parameter lists registered by the user. Without limitation to the parameter lists registered by the user, a plurality of parameter lists prepared in advance by using the printer driver 14b may be used, and the parameter list matching the condition may be acquired from the plurality of parameter lists that have been prepared in the driver 14b. In this modified example, similarly to the above-described embodiment, the parameter list suitable for the parameters set by the application 14c may be selected from among the plurality of the parameter lists, and then the selected parameter list may be used as the print settings.

In the embodiment described above, the parameter list acquired from among the parameter lists registered by the user is used as the print settings without a change. However, the printer driver 14b may change a parameter in the parameter list for a setting item to the parameter acquired from the print data for the setting item in S327 when the parameter of the print data is different from the parameter included in the parameter list for the setting item. The changed parameter list may be appointed as the print settings in S328.

In this modified example, parameters set for setting items other than the specific setting item in the application 14c may be used as the print settings, as well as the parameter for the specific setting item such as the paper size. Therefore, printing can be performed while fully reflecting the settings of the application 14c.

In the modified example, the parameter list acquired from the parameter lists registered by the user may be used as the print settings without change when the predetermined time (for example, 30 minutes) has elapsed after the parameter is set in the application 14c. However, when the elapsing time is less than the predetermined time, the parameters acquired from the print data may be reflected on the acquired parameter list.

In the embodiment described above, every time when the printing process of FIG. 3B is executed, the CPU 11 sends a query to the printer 30 that the printer driver 14b sets as a printer to perform printing, and then acquires the tray information of the query destination in S321. However, the tray information acquired from all the devices (including the printer 30) capable of using the printer driver 14b may be stored in the HDD 14 in advance, and in S321 the CPU 11 may acquire, from among the stored tray information, the tray information corresponding to the printer 30 set by the printer driver 14b as a printer for performing printing.

In the modified example, the tray information may be acquired as to-be-stored information from all the devices capable of using the printer driver 14b at various timings, such as an installation time of the printer driver 14b, an execution time of the parameter list registering process of FIG. 3A, and a periodical timing. Further, the tray information may be stored in the HDD 14 when the tray information is notified from the device capable of using the printer driver 14b.

In the embodiment described above, the reflected print setting is obtained by reflecting the parameters acquired from the print data on the default print settings, and the reflected print setting is used as the print settings when the number of parameter lists acquired in S323 is zero. However, the default print settings may be used as the print settings without change when the number of parameter lists acquired in S323 is zero.

In the embodiment described above, the CPU 11 is configured to execute the processes illustrated in FIGS. 3A and 3B. However, each of the processes illustrated in FIGS. 3A and 3B may be cooperatively executed by a plurality of CPUs. Further, each of the processes illustrated in the FIGS. 3A and 3B may be executed by a single IC such as ASIC or may be cooperatively executed by a plurality of ICs. In addition, each of the processes illustrated in FIGS. 3A and 3B may be cooperatively executed by the CPU 11 and the IC such as ASIC. An appropriate combination of the features described in the embodiment or the above-described modified examples may be configured to be performed.

What is claimed is:

1. A non-transitory computer readable storage medium storing a printer driver executable by a data processing apparatus, the data processing apparatus including a storage device, the data processing apparatus being configured to execute application program, the printer driver causing the data processing apparatus to perform:

receiving printer information from a printer that the printer driver is configured to control:

acquiring, in response to receiving print data from the application program, a parameter from the print data for at least one of a plurality of setting items relating to printing;

determining whether or not a plurality of predetermined parameter sets stored in the storage device includes a candidate predetermined parameter set that matches both the parameter acquired from the print data and the printer information received from the printer, each of the plurality of predetermined parameter sets including a plurality of predetermined parameters for the plurality of setting items relating to printing;

determining, as a print setting, one predetermined parameter set of the plurality of predetermined parameter sets on a basis of whether or not the plurality of predetermined parameter sets includes the candidate predetermined parameter set, the one predetermined parameter set being relevant to the parameter acquired from the print data;

generating a print command in accordance with the print setting; and outputting the print command to the printer.

2. The non-transitory computer readable storage medium according to claim 1, wherein the printer driver further causes the data processing apparatus to perform:

displaying, on a display device of the data processing apparatus, a screen for receiving a plurality of parameters for the plurality of setting items relating to printing; and storing, as a single predetermined parameter set, in the storage device a set of combinations of: the plurality of setting items relating to printing; and the plurality of parameters for the plurality of setting items relating to printing that are received via the screen.

3. The non-transitory computer readable storage medium according to claim 1, wherein a first combination is acquired in response to receiving the print data from the application program, the first combination being a combination of: a particular setting item; and a particular parameter acquired from the print data for the particular setting item, the particular setting item being one of the plurality of setting items relating to printing; and wherein the one predetermined parameter set includes the first combination.

4. The non-transitory computer readable storage medium according to claim 3, wherein the particular setting item indicates a paper size.

5. The non-transitory computer readable storage medium according to claim 3, wherein the plurality of setting items further include another setting item other than the particular setting item;

wherein the one predetermined parameter set further includes a second combination of: the another setting item; and another parameter for the another setting item; and wherein the printer driver further causes the data processing apparatus to perform:

changing, when the another parameter for the another setting item included in the one predetermined parameter set is different from a parameter acquired from the print data for the another setting item, the another parameter for the another setting item included in the one predetermined parameter set to the parameter acquired from the print data for the another setting item.

6. The non-transitory computer readable storage medium according to claim 1, wherein the printer information relates to a paper tray of the printer.

7. The non-transitory computer readable storage medium according to claim 1, wherein the printer driver further causes the data processing apparatus to perform:

displaying, when at least two candidate predetermined parameter sets are included in the plurality of predetermined parameter sets, on a display device of the data processing apparatus a screen for receiving a selection of one predetermined parameter set of the at least two candidate predetermined parameter sets, each of the at least two candidate predetermined parameter sets being one of the plurality of predetermined parameter sets that matches both the parameter acquired from the print data and the printer information received from the printer;

wherein the one predetermined parameter set selected through the screen is determined as the print setting.

8. The non-transitory computer readable storage medium according to claim 1, wherein the printer driver further causes the data processing apparatus to perform:

displaying, on a display device of the data processing apparatus, a screen for notifying that no candidate predetermined parameter set is included in the plurality of predetermined parameter sets when no candidate predetermined parameter set is included in the plurality of predetermined parameter sets.

9. The non-transitory computer readable storage medium according to claim 1, wherein the printer driver further causes the data processing apparatus to perform:

determining a modified default parameter set as the print setting when no candidate predetermined parameter set is included in the plurality of predetermined parameter sets, wherein the modified default parameter set is generated by modifying, to the parameter acquired from the print data, a default parameter included in the default parameter set for at least one of the plurality of setting items relating to printing for which the parameter is acquired from the print data.

10. The non-transitory computer readable storage medium according to claim 1, wherein the parameter acquired from the print data relates to a paper size.

11. The non-transitory computer readable storage medium according to claim 1, wherein the printer driver further causes the data processing apparatus to perform:

determining a number of candidate predetermined parameter sets; and determining a modified default parameter set as the print setting when the number of candidate predetermined parameter sets is zero, the modified default parameter set being generated by modifying, to the parameter acquired from the print data, a default parameter included in the default parameter set for at least one of the plurality of setting items relating to printing for which the parameter is acquired from the print data.

12. A data processing apparatus comprising:

a control device; and a storage device storing: application program; a printer driver executed by the control device; and a plurality of predetermined parameter sets, each of the plurality of predetermined parameter sets including a plurality of predetermined parameters for a plurality of setting items relating to printing, the printer driver causing the data processing apparatus to perform:

receiving printer information from a printer that the printer driver is configured to control:

acquiring, in response to receiving print data from the application program, a parameter from the print data for at least one of the plurality of setting items;

determining whether or not the plurality of predetermined parameter sets includes a candidate predetermined parameter set that matches both the parameter acquired from the print data and the printer information received from the printer;

determining, as a print setting, one predetermined parameter set of the plurality of predetermined parameter sets on a basis of whether or not the plurality of predetermined parameter sets includes the candidate predetermined parameter set, the one predetermined parameter set being relevant to the parameter acquired from the print data;

generating a print command in accordance with the print setting; and outputting the print command to the printer.

* * * * *